United States Patent [19]
Cahlander et al.

[11] Patent Number: 5,206,814
[45] Date of Patent: Apr. 27, 1993

[54] ROBOTIC MUSIC STORE

[75] Inventors: Robert L. Cahlander; Thomas E. Jung, both of Red Wing; David W. Carroll, Cannon Falls; Robert A. Hanson, Inver Grove Heights, all of Minn.

[73] Assignee: Robot Aided Manufacturing Center, Inc., Red Wind, Minn.

[21] Appl. No.: 595,203

[22] Filed: Oct. 9, 1990

[51] Int. Cl.⁵ .................................. G11B 15/68
[52] U.S. Cl. ............................. 364/479; 360/92; 414/273; 221/88
[58] Field of Search ............. 364/478, 479; 901/30, 901/31, 39; 360/92, 69, 90, 91; 414/730, 273, 280; 235/381; 395/80, 93; 221/79, 87, 88, 119

[56] References Cited

U.S. PATENT DOCUMENTS

| Re. 30,773 | 10/1981 | Glaser et al. | 235/379 |
|---|---|---|---|
| Re. 32,115 | 4/1986 | Lockwood et al. | 235/381 |
| D. 292,719 | 11/1987 | Maass | D20/1 |
| D. 294,204 | 2/1988 | Tombs et al. | D6/397 |
| D. 294,437 | 3/1988 | Tombs et al. | D6/397 |
| D. 302,178 | 7/1989 | King | D20/1 |
| D. 308,893 | 6/1990 | Weidinger | D20/1 |
| D. 321,723 | 11/1991 | Lack | D20/1 |
| 479,820 | 8/1892 | Little | 364/479 |
| 1,700,541 | 1/1929 | Mills | 235/375 |
| 1,787,644 | 1/1931 | Schermack | 235/375 |
| 2,321,402 | 6/1943 | Margulis | 274/15 |
| 2,655,242 | 10/1953 | Chalfin et al. | 194/10 |
| 2,686,583 | 8/1954 | Marder | 194/74 |
| 2,858,042 | 10/1958 | Gabrielsen et al. | 221/6 |
| 3,081,668 | 3/1963 | Nistri | 88/16.2 |
| 3,140,009 | 7/1964 | Wallace | 221/2 |
| 3,159,307 | 12/1964 | Stephenson et al. | 221/129 |
| 3,258,153 | 6/1966 | Morgan et al. | 221/3 |
| 3,729,117 | 4/1973 | Naito et al. | 221/9 |
| 3,757,037 | 9/1973 | Bialek | 178/6.6 A |
| 3,822,004 | 7/1974 | Bolen, Jr. | 194/15 |
| 3,990,710 | 11/1976 | Hughes | 274/1 R |
| 4,053,735 | 10/1977 | Foudos | 235/61.9 R |
| 4,094,462 | 6/1978 | Moschner | 235/419 |
| 4,134,537 | 1/1979 | Glaser et al. | 235/379 |
| 4,282,575 | 8/1981 | Hoskinson et al. | 364/479 |
| 4,304,992 | 12/1981 | Kobayashi et al. | 235/449 |

(List continued on next page.)

FOREIGN PATENT DOCUMENTS 60-222317 10/1985 Japan.
0738867 6/1980 U.S.S.R. .

OTHER PUBLICATIONS

"Solid State Scan Modules" Product Literature (no date).
"Super Robot" Product Literature (no date).
"RAM Center Advances the Robotic Field", *Minnesota Technology*, Spring 1991. Cover and pp. 8-9.
"RAM addition on drawing board", *Republican Eagle* (Oct. 21, 1989).
"Brainivend 2000" Product Literature (1992).
"Hollywood Express" Product Literature (no date).
Letter from Lawrence Fitch (Nov. 22, 1989).

*Primary Examiner*—Jerry Smith
*Assistant Examiner*—Paul Gordon
*Attorney, Agent, or Firm*—Merchant, Gould, Smith, Edell, Welter & Schmidt

[57] ABSTRACT

The invention concerns an automated vending system which uses a commercially available, multi-axis robot arm to retrieve an article from a storage location and deliver the article to a customer. The invention includes a control system which interacts with at least three entities: (a) the customers; (b) credit card agencies, as by verifying the customer's credit situation and by performing daily credit reconciliations; and (c) the control system of the robot arm, as by informing the robot which articles to retrieve. The invention includes a display which provides to the customer a catalog of articles, and allows the customer to choose an article for purchase from the catalog. The invention allows remote control of the vending system, by telephone, whereby the system can be shut down in case of malfunction. If the vending system is used to sell music recordings, the invention allows the customer to hear samples of selected recordings available for sale.

17 Claims, 15 Drawing Sheets

U.S. PATENT DOCUMENTS

| | | | |
|---|---|---|---|
| 4,317,028 | 2/1982 | Simjian | 235/380 |
| 4,385,285 | 5/1983 | Horst et al. | 382/3 |
| 4,412,292 | 10/1983 | Sedam et al. | 364/479 |
| 4,567,359 | 1/1986 | Lockwood | 235/381 |
| 4,634,848 | 1/1987 | Shinohara et al. | 235/449 |
| 4,645,916 | 2/1987 | Raisleger | 235/494 |
| 4,647,989 | 3/1987 | Geddes | 360/55 |
| 4,653,009 | 3/1987 | Brown | 364/479 |
| 4,654,727 | 3/1987 | Blum et al. | 360/71 |
| 4,670,798 | 6/1987 | Campbell et al. | 360/12 |
| 4,675,515 | 6/1987 | Lucero | 235/381 |
| 4,750,151 | 6/1988 | Baus | 364/900 |
| 4,752,676 | 6/1988 | Leonard et al. | 235/379 |
| 4,806,740 | 2/1989 | Gold et al. | 235/449 |
| 4,814,592 | 3/1989 | Bradt et al. | 235/381 |
| 4,839,829 | 6/1989 | Freedman | 364/519 |
| 4,846,619 | 7/1989 | Crabtree et al. | 414/273 |
| 4,864,511 | 9/1989 | Moy et al. | 364/478 |
| 4,869,813 | 9/1989 | Bailey et al. | 209/538 |
| 4,896,791 | 1/1990 | Smith | 221/7 |
| 4,907,889 | 3/1990 | Simone | 360/92 |
| 4,920,432 | 4/1990 | Eggers et al. | 360/92 |
| 4,922,435 | 5/1990 | Cahlander et al. | 364/513 |
| 4,937,436 | 6/1990 | Eglise et al. | 235/380 |
| 4,954,697 | 9/1990 | Kokubun et al. | 235/381 |
| 4,970,655 | 11/1990 | Winn et al. | 364/479 |
| 4,979,864 | 12/1990 | Cahlander et al. | 414/421 |
| 4,981,235 | 1/1991 | Ferrini et al. | 221/23 |
| 4,995,498 | 2/1991 | Menka | 194/205 |
| 4,997,076 | 3/1991 | Hirschfeld et al. | 194/212 |
| 5,020,958 | 6/1991 | Tuttobene | 414/281 |
| 5,042,686 | 8/1991 | Stucki | 221/13 |
| 5,143,193 | 9/1992 | Geraci | 194/212 |

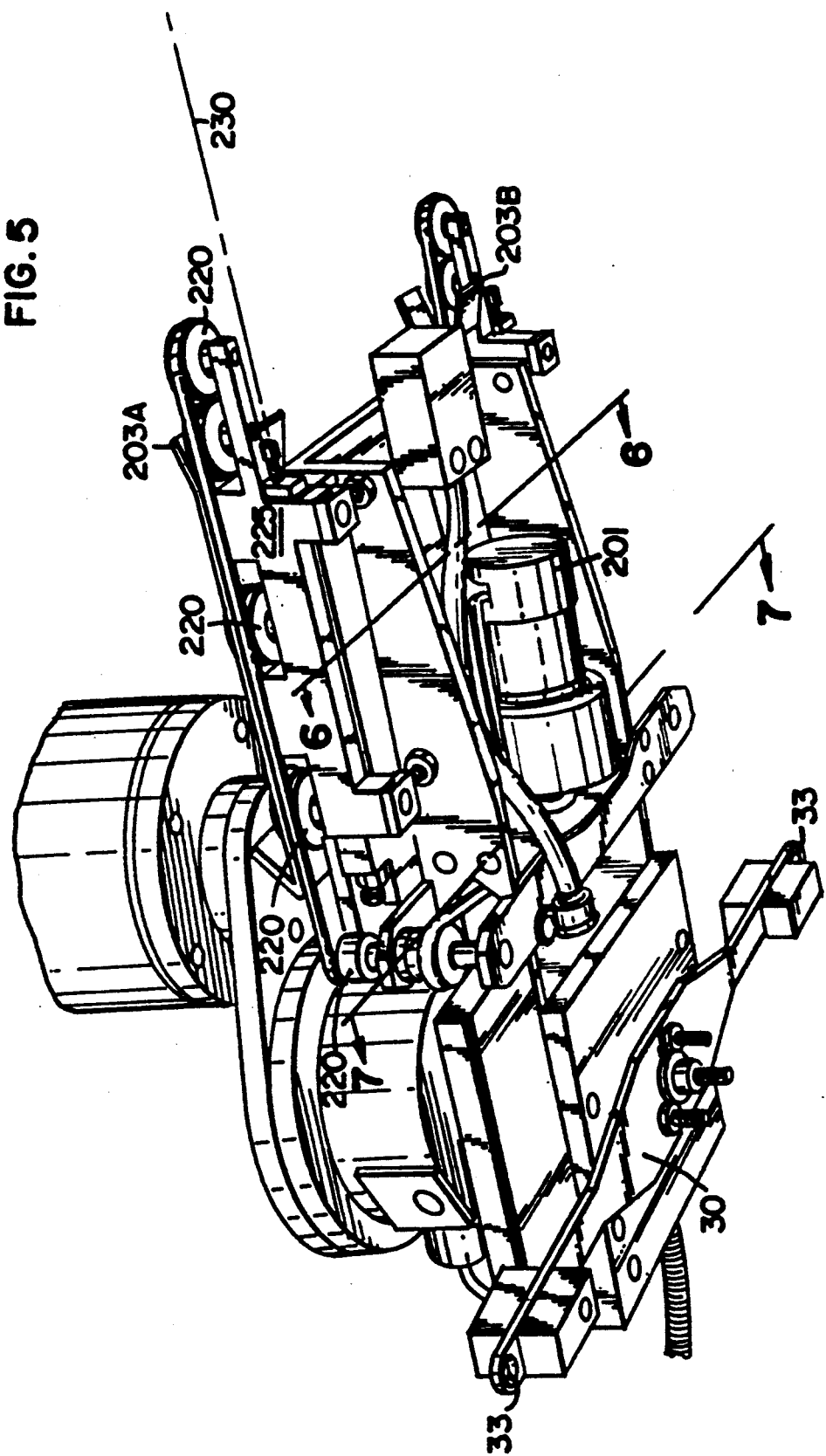

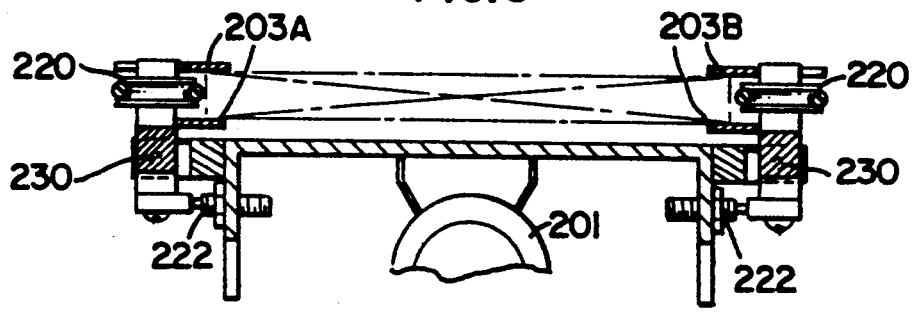
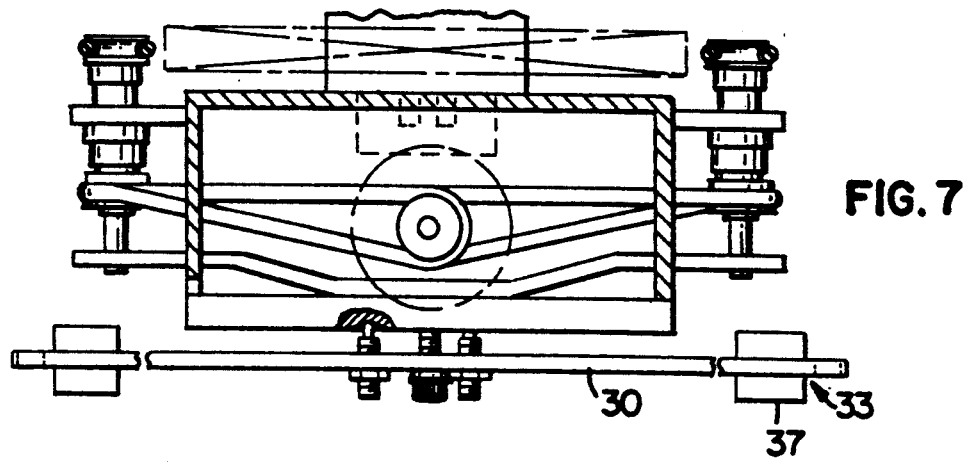
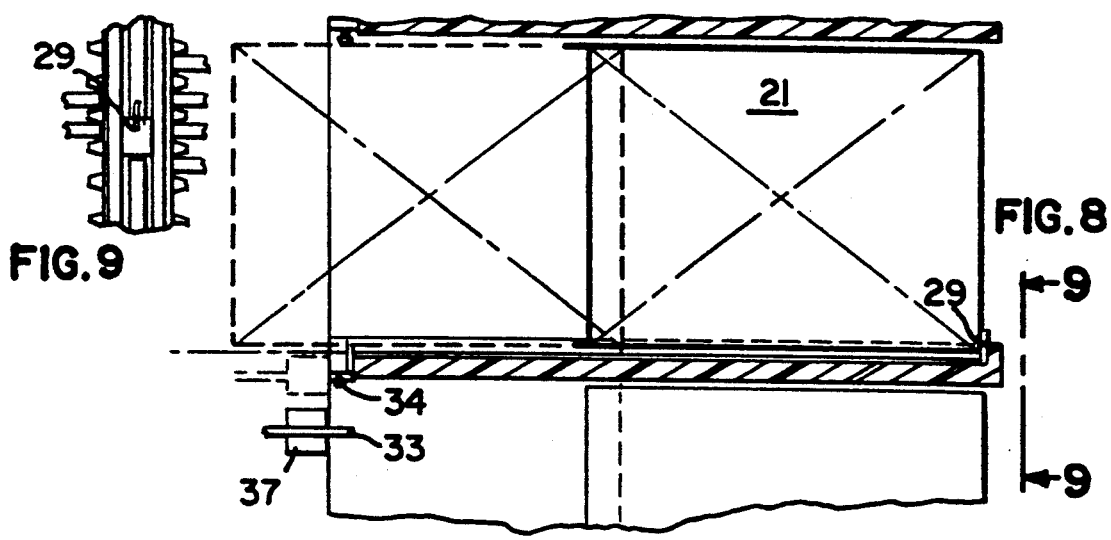

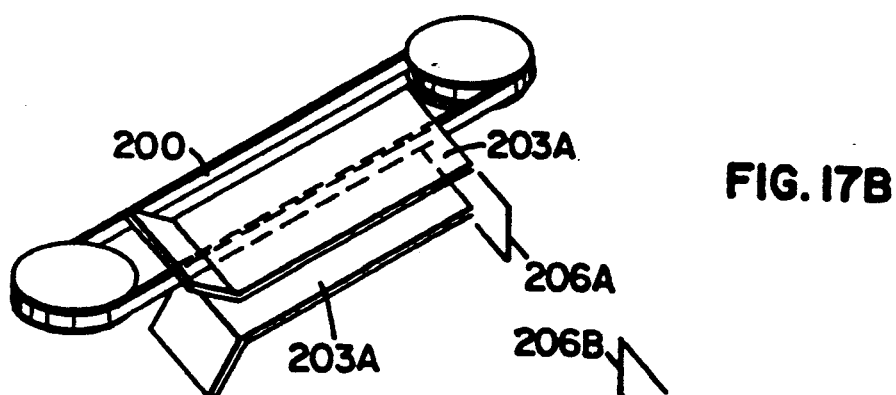
FIG. 17B
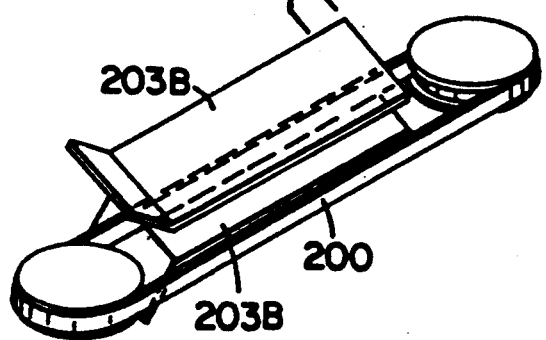
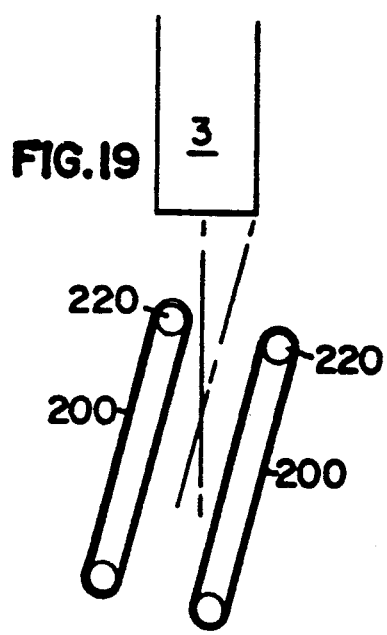
FIG. 19
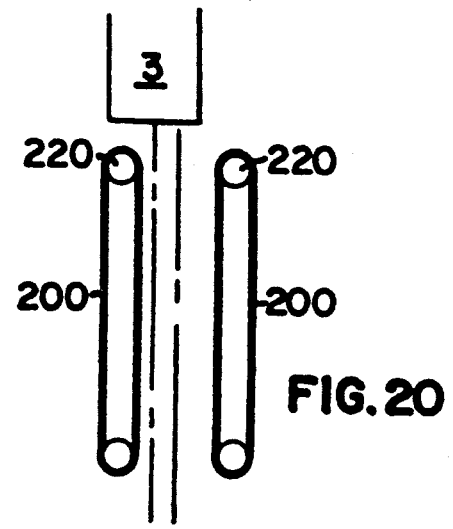
FIG. 20
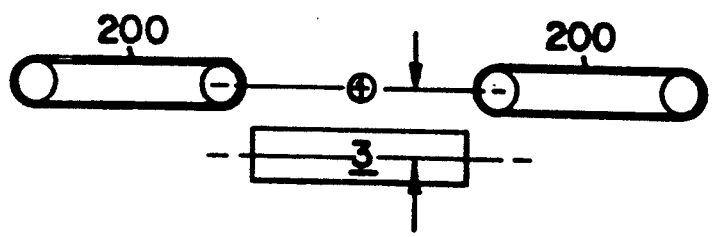
FIG. 21

ROBOTIC MUSIC STORE

The invention concerns an automated retail store in which a robot does the following: deliver merchandise which is ordered by a customer, accept payment (either in cash or by credit card), make change, and perform other functions.

BACKGROUND OF THE INVENTION

In the sale of music recordings, such as long-play records, cassette tapes, and compact discs, a customer typically browses through racks of recordings, selects one or more, and carries his selections to an attendant who sells the selections to him. In the present context, this type of sales procedure involves three important features.

One, the number of recordings which can be stored on a given amount of floor space is limited because the recordings must be easy for the customer to both view and grasp. That is, the recordings cannot be stacked floor-to-ceiling. Two, according to some merchandising theories, a customer is more inclined to purchase a product if that product is displayed with numerous identical products. Such displays are expensive. Three, the requirement of the attendant imposes an expense, which is further increased if 24-hour operation is desired. Moreover, with 24-hour operation, the expense of the attendant is disproportionately increased for sales occurring at unusual hours. That is, fewer sales will be made per hour late at night, yet the cost of an attendant for a late-night hour does not necessarily decrease.

Automated vending equipment can eliminate some of these features. However, many automated vending systems use machinery which is designed for a specific vending task. This machinery is not easily adaptable to other vending tasks. The custom-designing of such machinery is expensive.

OBJECTS OF THE INVENTION

It is an object of the invention to provide an improved automated vending system, having no attendant, and operable 24 hours per day.

It is a further object of the invention to provide an automated vending system which utilizes an articulated robot arm which is commercially available, thereby eliminating the requirement of designing such an arm.

It is a further object of the invention to provide an automated vending system having a high packing density of articles to be sold.

It is a further object of the invention to provide a vending system in which the available quantity of a particular item to be sold is not relevant to a customer.

SUMMARY OF THE INVENTION

In one form of the invention, a commercially available robotic arm is used to select an article from a collection of articles for sale, and to deliver the selected article to a customer. A control system communicates with the customer, and gives instructions to a second control system which controls the arm. A particular type of gripper is carried by the arm for grasping the articles.

BRIEF DESCRIPTION OF THE DRAWINGS

FIG. 5 shows a perspective view of the gripper of FIG. 4.

FIG. 6 is a cross-sectional view of the gripper of FIG. 5, taken in the direction of arrows 6—6 in FIG. 5.

FIG. 7 is another cross-sectional view of the gripper of FIG. 5, taken in the direction of arrows 7—7 in FIG. 5.

FIG. 8 is a cross-sectional view of the rack of FIG. 3, taken in the direction of arrows 8—8 in FIG. 3. FIG. 8 shows a drawer 29 which carries a box 21.

FIG. 9 is an end-on view of the drawer 29 of FIG. 8, taken in the direction of arrows 9—9 in FIG. 8.

FIG. 17B is a schematic view of guides associated with the belts of FIG. 17A.

FIG. 19 illustrates angular misalignment between the belts and a box 3.

FIG. 20 illustrates horizontal misalignment between the belts and a box 3.

FIG. 21 illustrates vertical misalignment between the belts and a box 3.

DETAILED DESCRIPTION OF THE INVENTION

Overview

Figure 4:
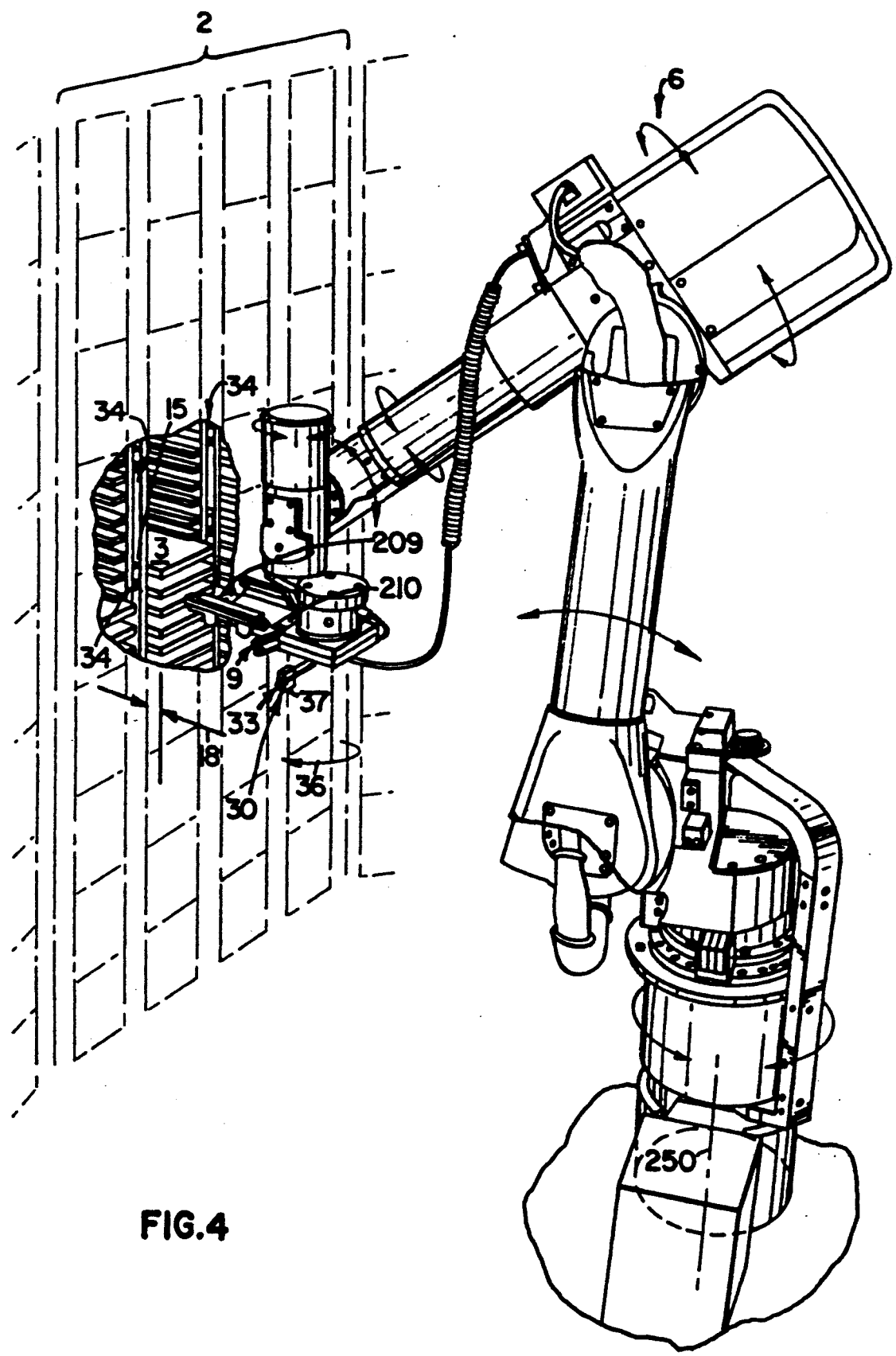
FIG. 4 shows a perspective view of a robotic arm which positions a gripper near a rack, in order to withdraw a box from the rack.

FIG. 4 illustrates a rack 2 of boxes 3, each of which contains a compact disc (CD) available for purchase by a customer. After the customer identifies a CD for purchase, a six-axis robot arm 6 positions a gripper 9 adjacent the CD's box. The gripper withdraws the box and then deposits it into a chute (not shown) which delivers the box to the customer.

Figure 1:
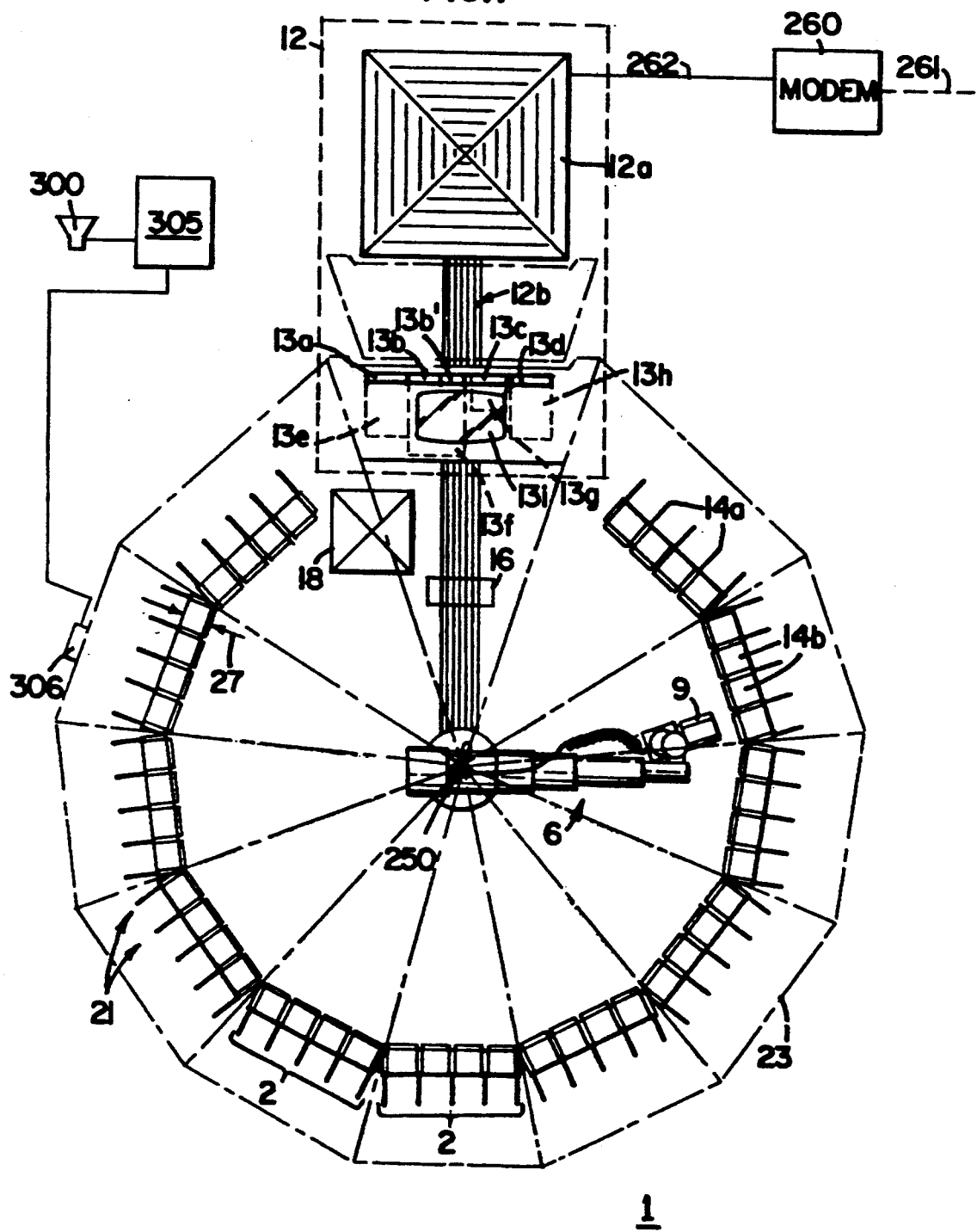
FIG. 1 shows a top view of the invention.
Figure 2:
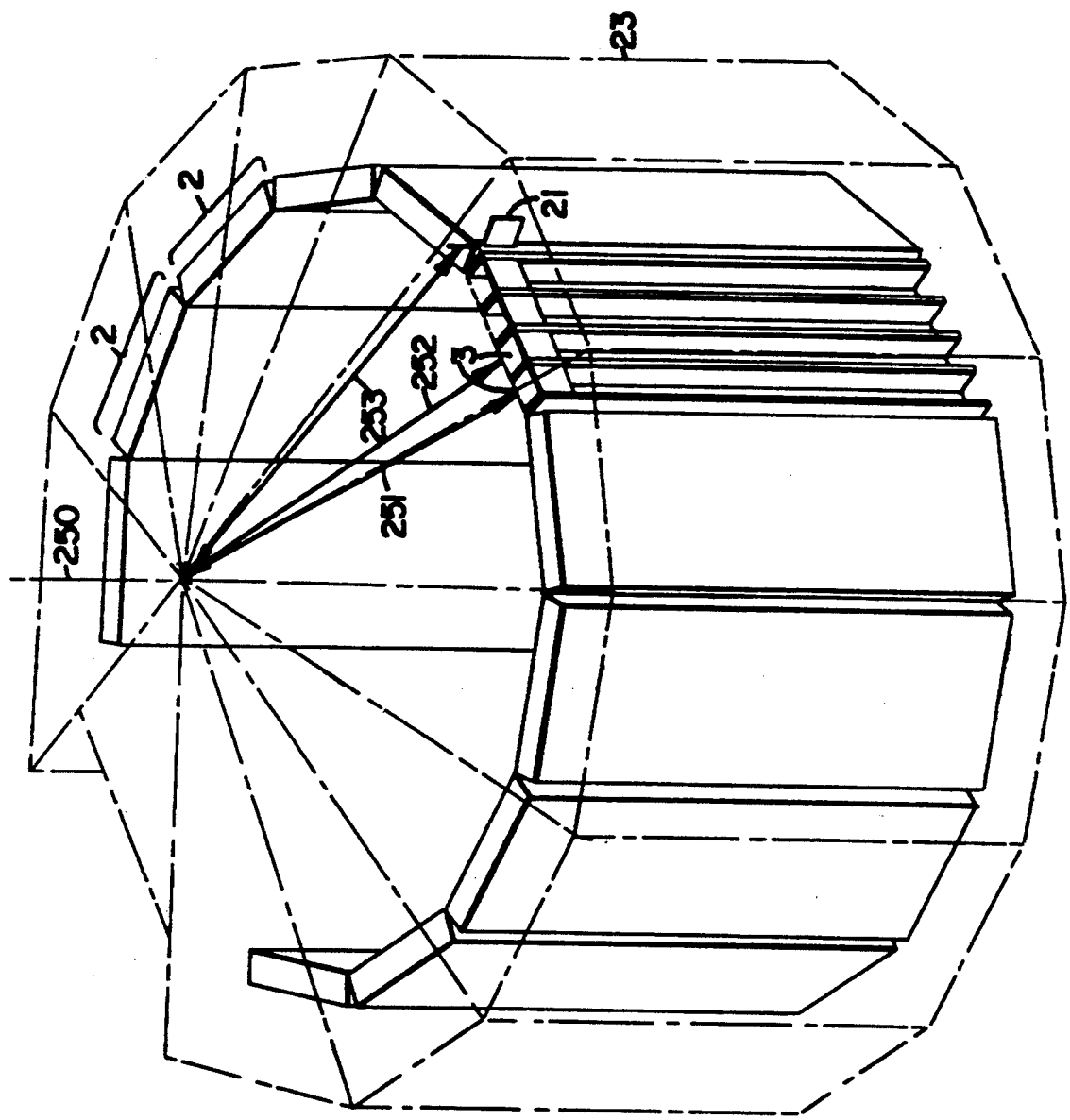
FIG. 2 shows a perspective view of racks of boxes of compact discs, each rack forming one side of a polygon.

The racks of CD's are arranged in a polygonal array, as shown in FIGS. 1 and 2. With this arrangement, each rack provides a planar array of CD's for the robotic arm, with each CD having a unique x-y coordinate within its own rack.

A control system 12 in FIG. 1 controls the operation of the robot arm, and also interacts with the purchaser on matters such as CD selection and payment. The control system can also follow remote instructions transmitted by telephone from the owner of the retail store, in order to perform such tasks as transmission of sales data, or de-activating equipment in the case of malfunction.

The robot is an articulated arm, model S-10, available from GMF Robotics, located in Troy, Mich. This discussion will now consider the system in more detail.

THE CD RACKS

Figure 3:
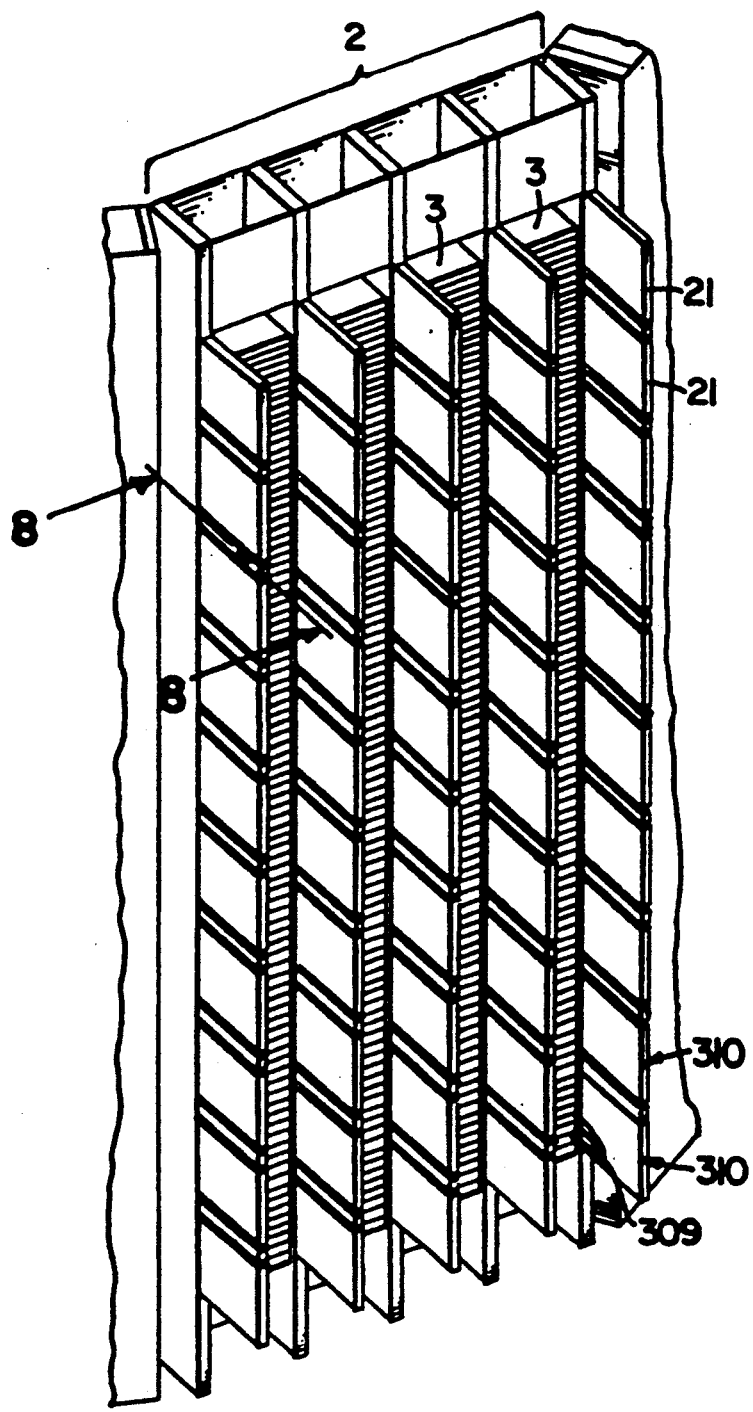
FIG. 3 shows a perspective view of one of the racks of boxes.

The CD's are packaged in rectangular boxes which measure approximately 4.9×5.6×0.4 inches. As shown in FIG. 3, the boxes are stored in cells defined by guides 15. The guides cooperate to form slots. As shown in FIG. 3, each rack provides a planar array of four boxes across and 107 boxes vertically (the exact number stacked vertically is not shown). Several racks are combined into the polygonal shape shown in FIGS. 1 and 2.

One reason for using the polygonal shape is that the robot arm is designed to accept instructions in terms of x-y coordinates, and not in spherical- or cylindrical coordinates. That is, the robotic arm can be easily programmed to move the gripper to an x-y coordinate in a specified plane. Accordingly, each individual rack is arranged to present a planar array of boxes to the robot.

To initially inform the robot of the location of the plane of each rack, the racks are first set into their final positions and then the gripper is positioned at three known marks on each rack. The three marks define a plane. Since the robot always knows the x-y-z position of the gripper, and since the x-y-z coordinate of each mark, with respect to the rack, is known, the robot thus learns the actual location of the plane of the rack. Thus, in effect, the robot acquires an address for each plane. Each box has an address (its x-y coordinate) within each plane.

Each box protrudes from its rack by distance 18 in FIG. 4. The protrusion allows a particular gripper 9 to be used to withdraw the box. The gripper is described later.

There are two types of cells holding the CD-boxes, namely, horizontal (or prone) and vertical (or upright) cells. The horizontal cells were described above. The CD-boxes 21 in vertical cells are shown in FIGS. 1 and 3. The vertical cells extend from the racks, so that the flat surfaces of the CD-boxes are visible to a customer located outside an enclosure 23 in FIG. 1. The flat surfaces contain photographs or other advertising information regarding the CD contained within the box. The recording industry devotes considerable attention to the artistic design of the CD-boxes, and the display of the artwork is believed to attract customers. Also, the display allows the customers to read the labels of the boxes. The labels list the songs contained on the CD.

The vertical CD-boxes 21 are withdrawn differently than are the horizontal boxes, because the vertical boxes are not only oriented differently (vertically, not horizontally) but also located at different locations than the horizontal boxes (behind the racks 2, with respect to the robotic arm).

The vertical boxes 21 are placed on shallow drawer 29 in FIG. 8. For withdrawl, the gripper 9 first rotates 90 degrees, in the direction of arrow 36 in FIG. 4, so that an eylet 33 contained on an arm 30 in FIGS. 4, 5, and 7 can engage a stud 34 in FIGS. 4 and 8, which is attached to the drawer 29 in FIG. 9. After engagement, the robot arm draws the drawer toward itself, pulling the CD-box 21 to the phantom position in FIG. 8. Then, the robot arm rotates the gripper by 90 degrees to its original position (i.e., opposite to arrow 36 in FIG. 4), rotates the gripper 90 degrees so that the space between the belts is vertical, and grasps the CD-box in the usual manner.

The belts are described in the next section. The rotation of the gripper so that the space between the belts becomes vertical (for grasping a vertical CD) requires a coordinated movement of several of the robot arms about several axes: rotation about a single axis is not sufficient. However, the robot is designed to execute this maneuver in response to simple commands: the robot control system coordinates the articulation of the limbs of the arm.

A guide block 37 in FIGS. 4, 7 and 8 facilitates engagement between the stud and the eyelet. The drawer 29 is thinner than the thickness of the box, as shown in FIG. 9, thus allowing the gripper to grip the box, as the next section will make clear.

GRIPPER

Figure 17A:
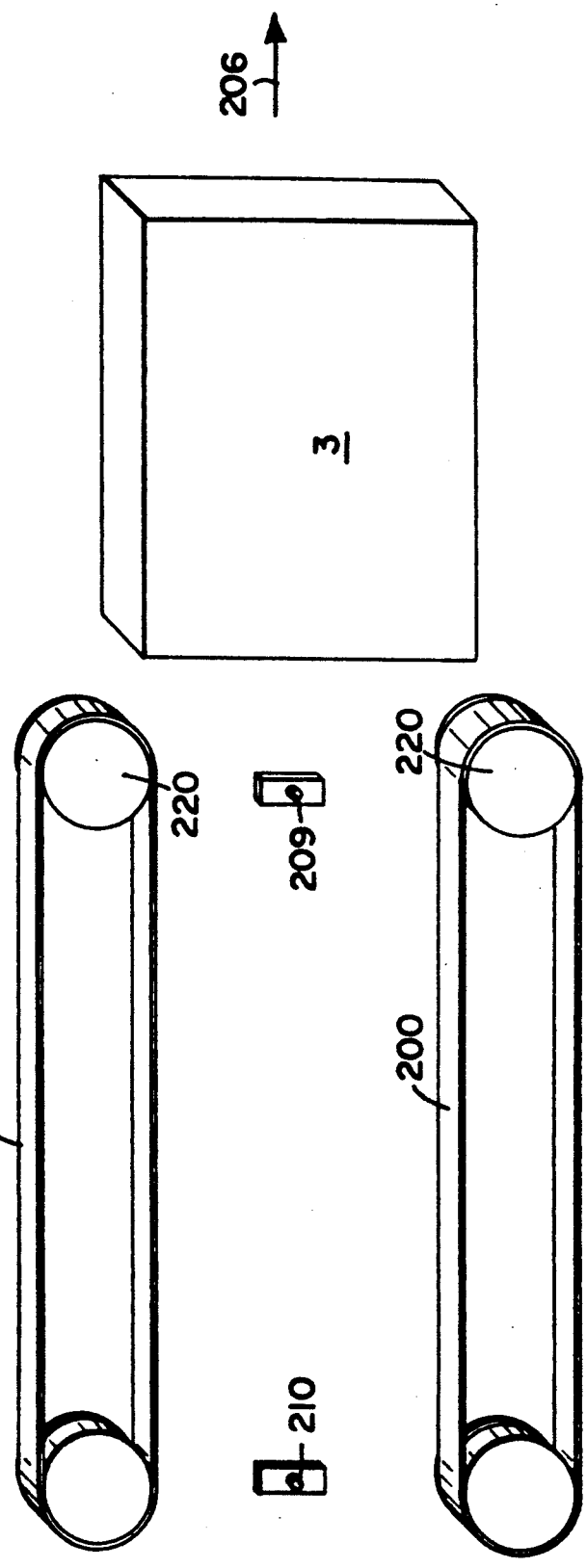
FIG. 17A is a schematic view of the belts of the gripper, which grasp box 3.

The gripper is schematically shown in FIG. 17A. Two conveyor belts 200 (which are o-rings) are brought into contact with a CD-box 3 by the robot arm (not shown). Just prior to the contact, a motor 201 (not shown in FIG. 17A, but shown in FIG. 5) begins running the conveyor belts. Then, when the belts contact the box, the moving belts draw the box into the space between them. During motion of the box, two pairs of guide rails 203A and 203B, shown schematically in FIG. 17B and more realistically in FIGS. 5 and 6, guide the box into channels 206A and 206B. When the box has advanced sufficiently far into the channel, the motor shuts off, and the box is held captive by the combined action of (a) the channel walls which it contacts and (b) pressure of the belts themselves (which are slightly compressed).

In a sense, the combined action of the belts and channels cradle the CD-box. A "cradle" is formed because the CD-box is restrained against motion in all directions except one, namely, motion opposite (i.e., in the direction of arrow 206) to the insertion motion (subject to friction of the belts). The slots defined by guides 15 in FIG. 4 can also be viewed as "cradling" the CD-boxes: can move in a single direction, namely, out of the slot, and in no other direction. Thus, in moving the CD-box from one pair of slots to another, the gripper moves a CD-box from one cradle to another.

Two optical sensors 209 and 210 in FIGS. 17A and 4 detect successful capture of a box. Sensors such as a diffuse photo sensor, model no. SE 612-D, available from Banner Engineering Corp., Minneapolis, Minn., can be used. Success is deemed to occur when the following sequence occurs: (a) a BOX PRESENT signal from the first sensor 209 (an "entry sensor"), followed by (b) a BOX PRESENT signal from the second sensor 210 (an "arrival sensor"), along with a BOX ABSENT signal from the entry sensor.

If successful capture is not detected, then it is possible that the box has jammed in the gripper. Jamming is inferred by a BOX PRESENT signal at the entry sensor 209, together with a BOX ABSENT signal at the arrival sensor 210, with both signals persisting for a preset time duration. (The persistence is required because such a combination of signals is momentarily produced during normal box-grasping.) When jamming is inferred, an error signal is produced, and the store is closed: no more customers are serviced.

Alternately, if successful capture has not occurred, but jamming is absent, it is possible that the box has fallen from the gripper, although dropping has been found to be a very uncommon event. In such a case, the gripper is still functional for withdrawing other boxes. Such a situation is inferred from a BOX ABSENT signal produced by both sensors. When a box has been dropped, the control system (later described) refunds the customer's money for the dropped box, and allows the customer to continue with purchases if desired. Alternately, the customer can opt to terminate the transaction.

It is possible for the control system to cycle the belts forward and then backward in order to clear a jam.

Figure 18C:
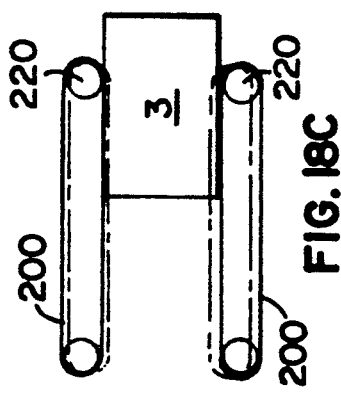
FIGS. 18A, 18B, and 18C illustrate a sequence of events occurring when the belts of FIG. 17A draw a box 3 between them: the belts spread apart.
Figure 18B:
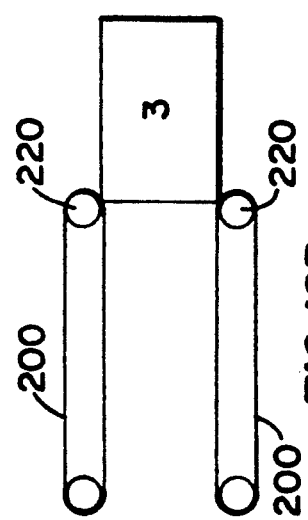
Figure 18A:
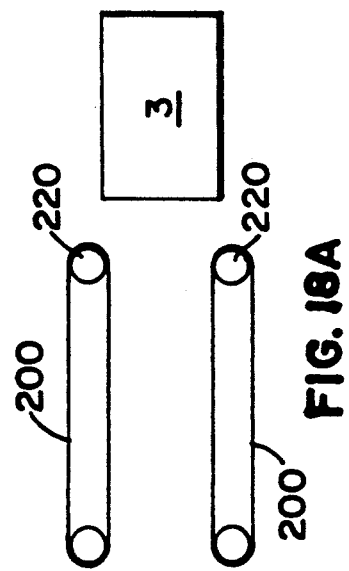

The actual belts are carried by floating, spring-loaded sheaves 220 in FIG. 6. The sheaves pivot about pivots 230. The pivoting causes the sequence of events shown in FIGS. 18A–18C to occur. Just prior to contact with the box 3, the sheaves are in position shown in FIG. 18A. Then, the belts start moving, and the box is drawn between the sheaves, as shown in FIG. 18B. Now, the box forces the sheaves apart, as shown in FIG. 18C. The force of the springs 222 in FIG. 6 causes the sheaves to pinch the box.

In FIG. 5, all five sheaves 220 are carried by a common frame 225, which pivots about pivot axis 230, in order to pinch the box. The opposite frame 230 pivots in a similar manner.

It is possible to replace the belt-sheave system by individual rubber-tired wheels. However, in such a case, the drive system for the multiple wheels may be more complicated.

CONTROL SYSTEM

Figure 14:
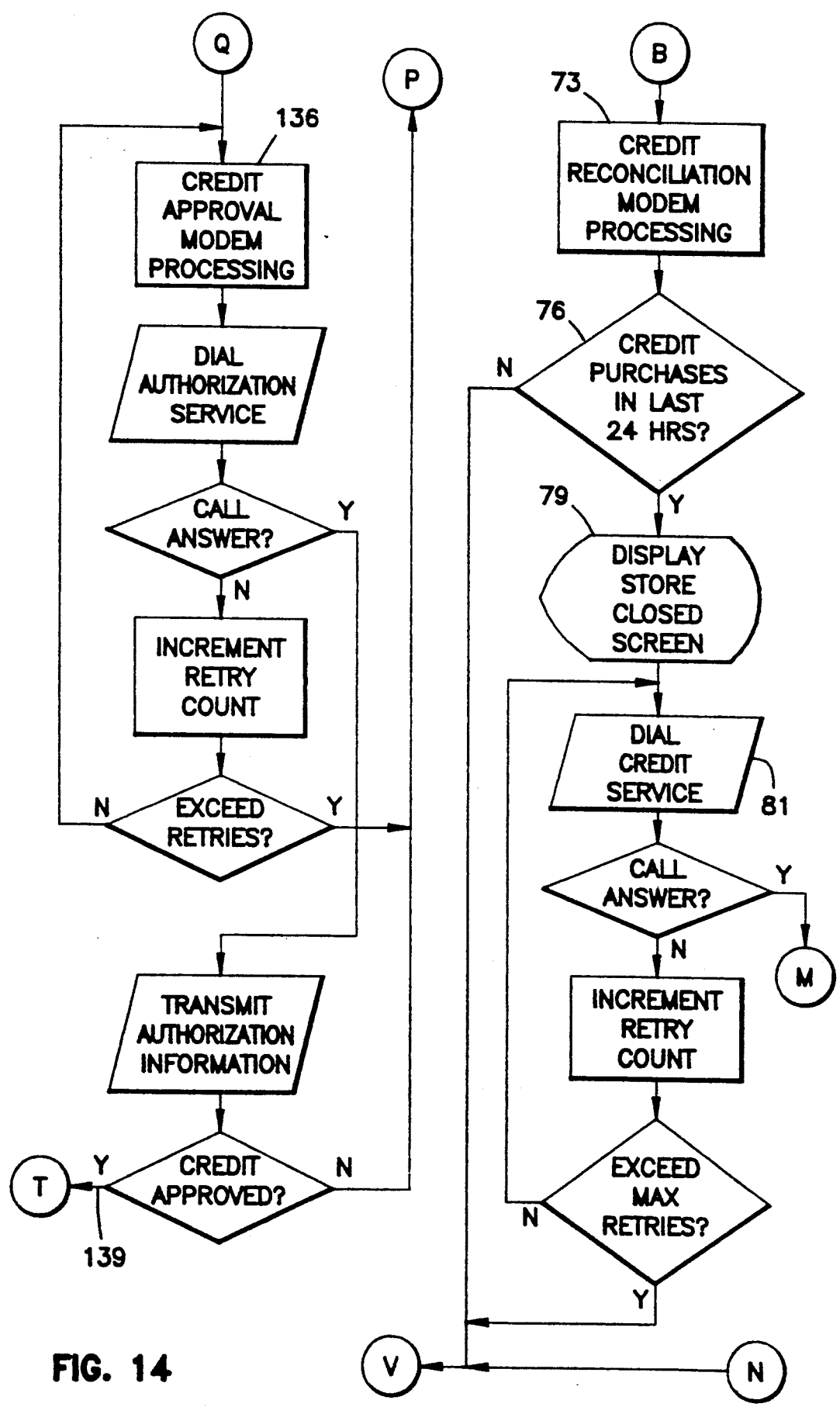
Figure 15:
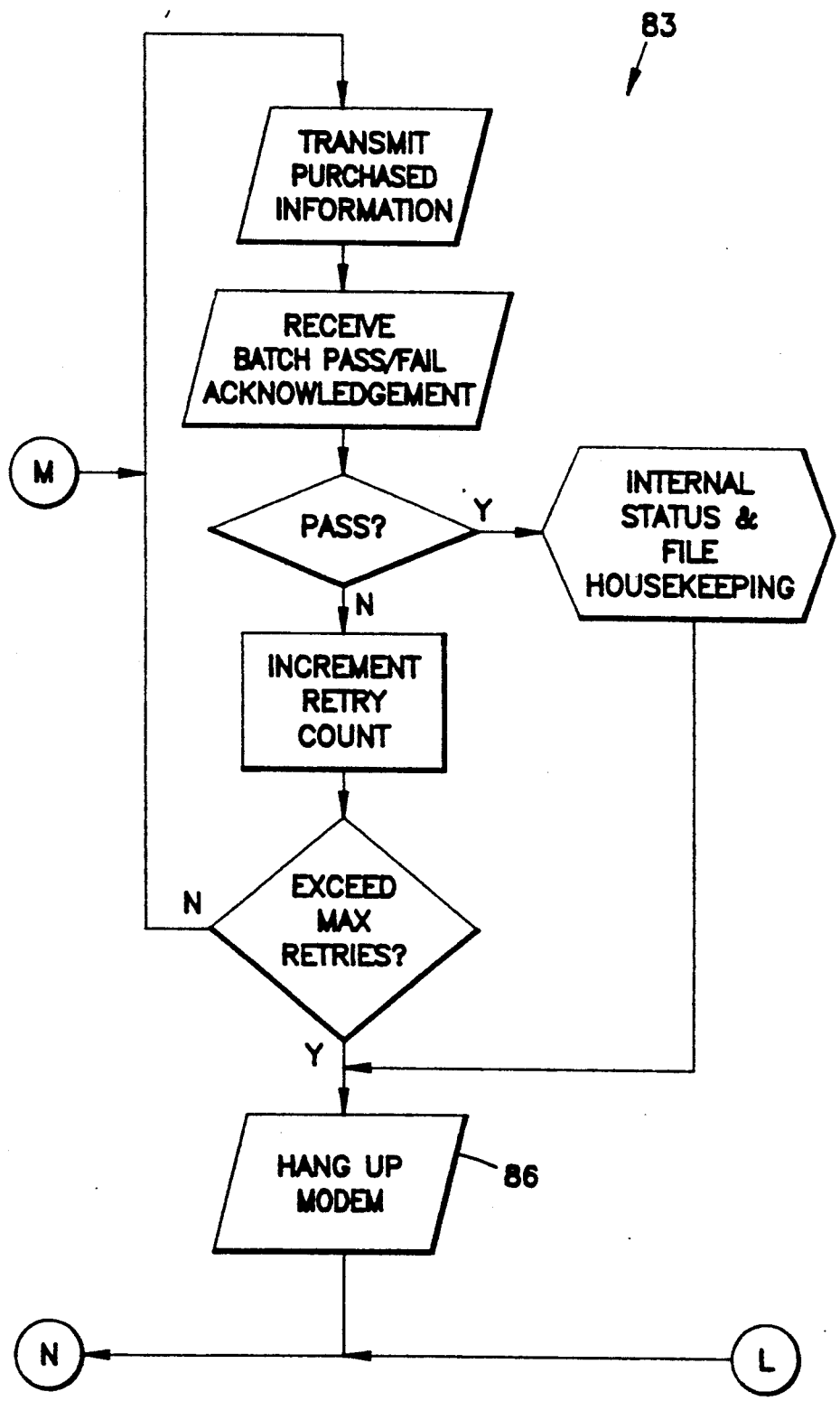
Figure 16:
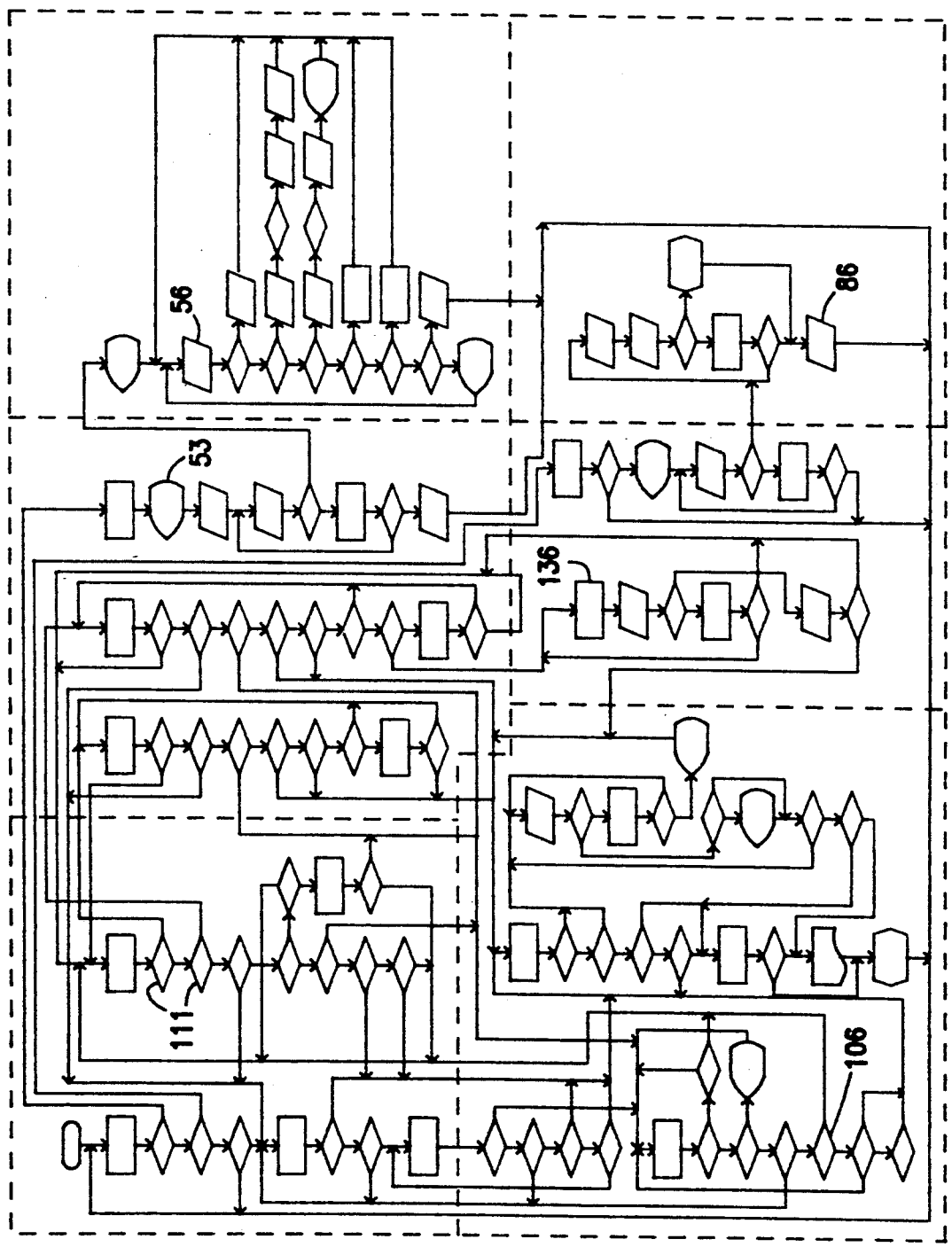
FIG. 16 is an overview of FIGS. 10-15.

A flowchart for the system which controls the robot arm is given in FIGS. 10–15, with an overview given in FIG. 16. In brief, the control system performs three main functions. One, it responds to incoming telephone instructions. These instructions can order the control system to (a) transmit reports (such as sales information or data on malfunctions), (b) accept and store information (such as dates of CD sales), or (c) activate and deactivate the power supply of the store (as in the case of a malfunction).

Two, it performs cash reconciliations at day's end by remotely communicating with credit card agencies.

Three, it displays a catalog of available CD's on a customer video display, and takes orders from the customers. It accepts either cash payments or credit card payments from the customer, and makes change in the former case. In greater detail, the control system functions as follows:

Remote Maintenance

Figure 10:
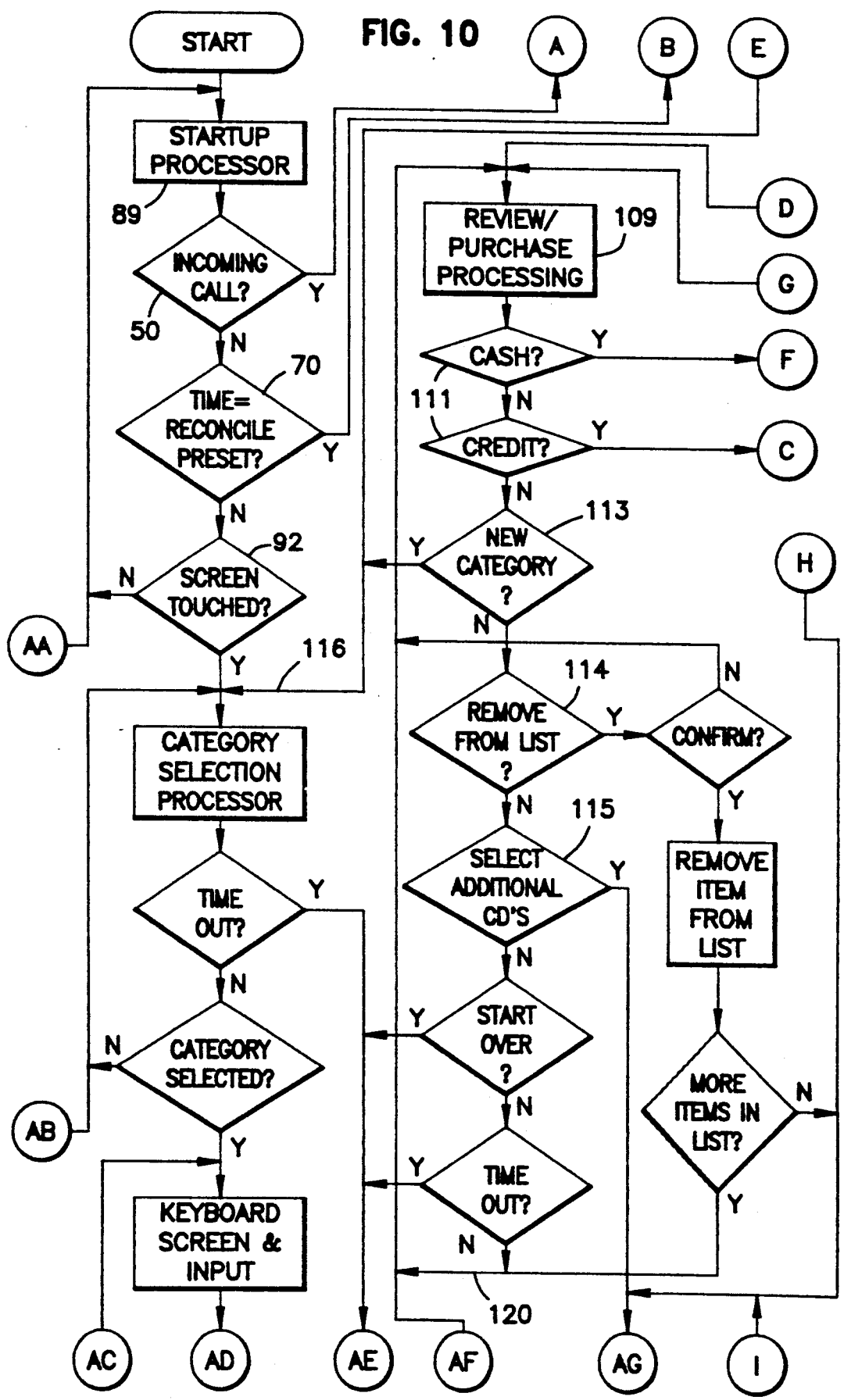
FIGS. 10–15 are a flow chart describing the operation of the control system used with the invention.
Figure 11:
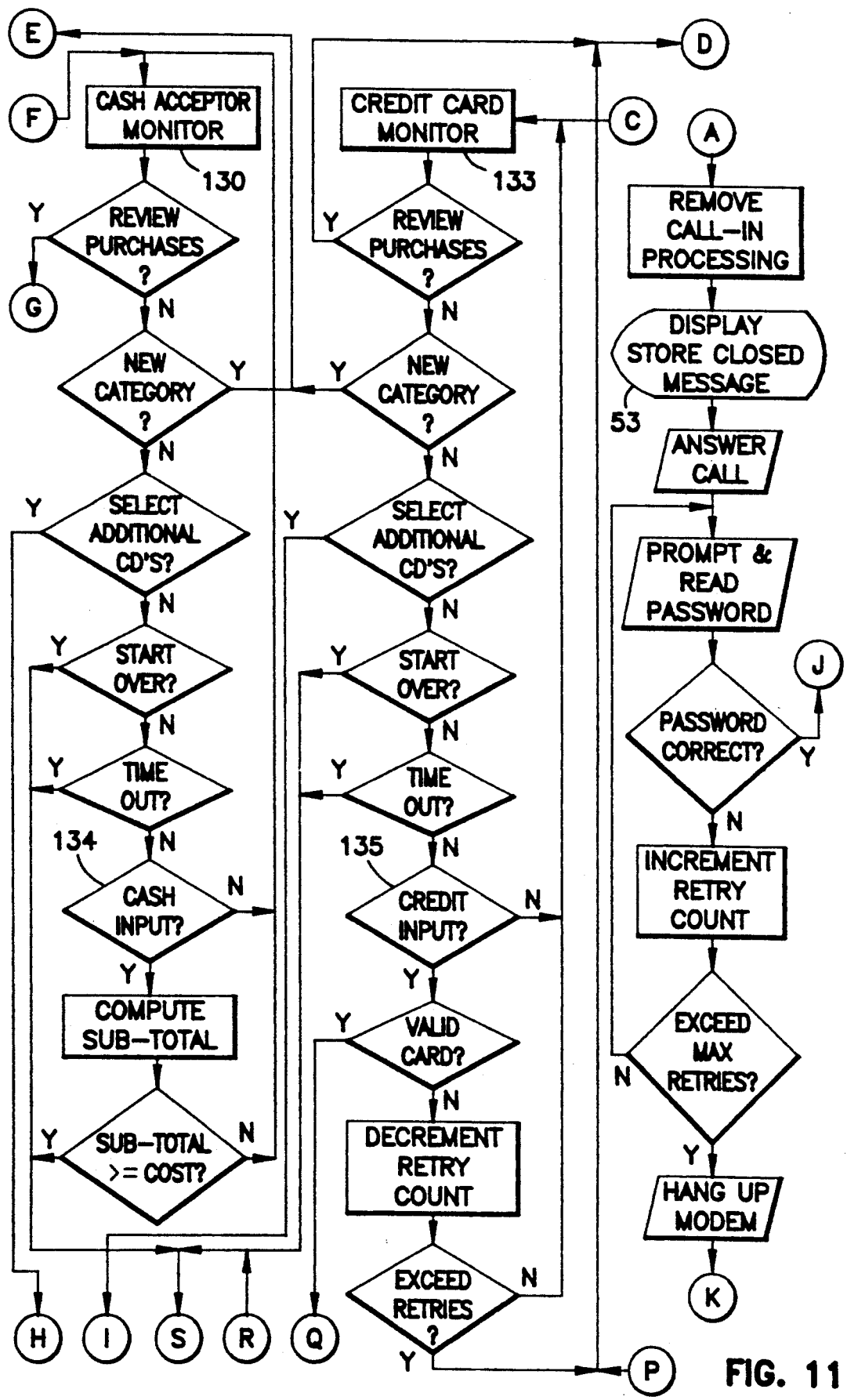
Figure 12:
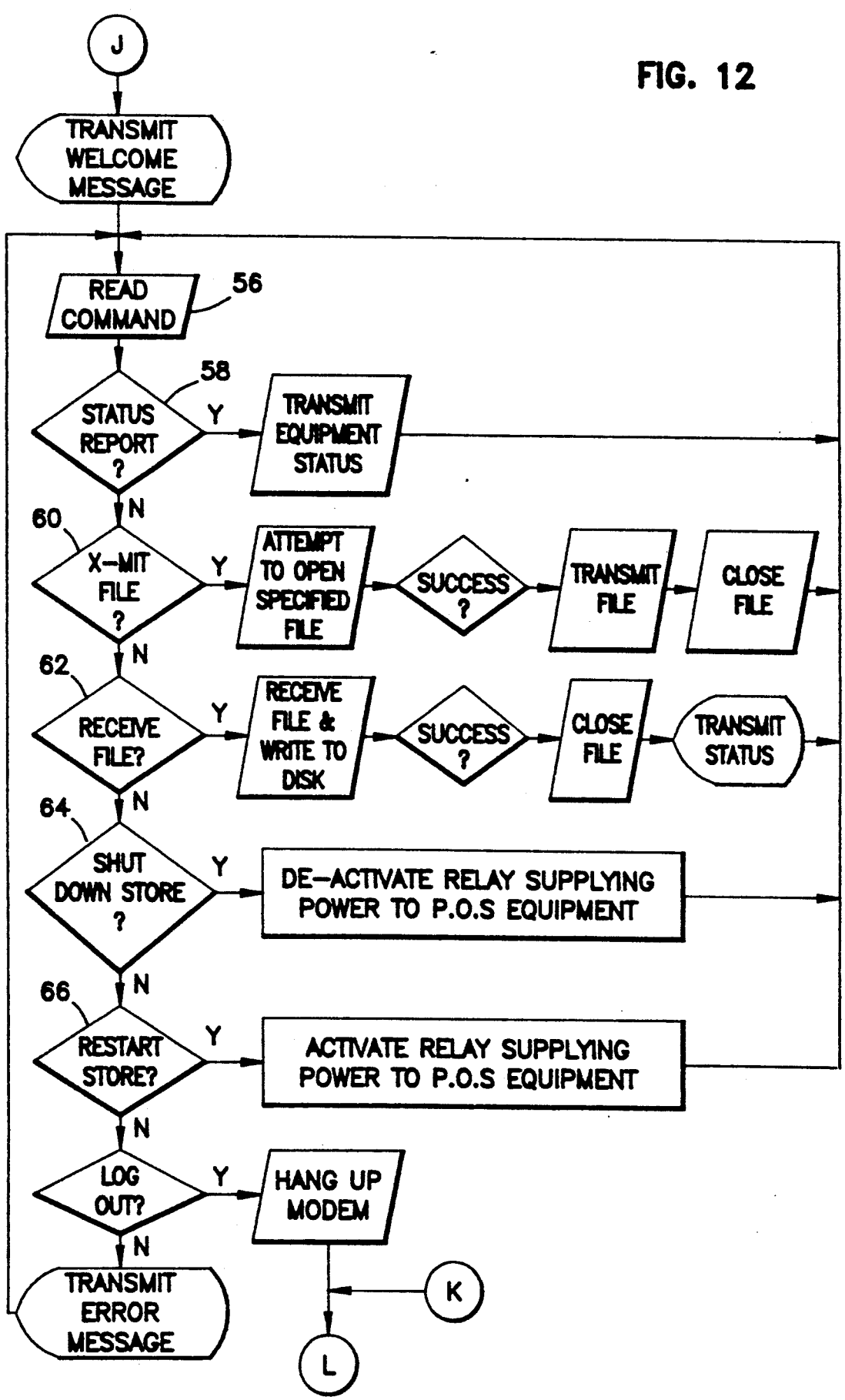

Block 50 in FIG. 10 responds to an incoming telephone call, such as from the owner of the robotic store. During such a call, the control system temporarily closes down the store, and block 53 in FIG. 11 causes the customer video display to show a message so indicating. When the incoming caller presents the correct password, the caller reaches block 56 in FIG. 12, from which he can initiate any of the actions indicated by blocks 58, 60, 62, 64, or 66. As these blocks indicate, the caller can learn about the status of the store's equipment (block 58), obtain data files from the control system (block 60), deliver data files to the system (block 62), and activate or deactivate the power supply to the store (block 62 and 64). When the caller finishes the transaction, the system returns to block 89 in FIG. 1.

Daily Credit Reconciliation

Block 70 in FIG. 10 inquires whether the time of day is proper for performing daily reconciliations of credit card transactions. If so, block 73 in FIG. 14 is reached. Block 76 then inquires, in effect, whether any credit transactions have occurred since the last reconciliations (which occurred 24 hours ago). If so, the control system temporarily closes the store to the public, and block 79 displays a message on the customer video terminal so indicating.

Block 81 initiates a telephone call to the proper credit data office, and when the call is completed, blocks 83 in FIG. 15 transmit the necessary credit information. When the reconciliation is complete, block 86 leads to block 89 in FIG. 10, which leads to block 92.

Customer Interaction

In brief, the customer can call up a list of CD's available, organized according to categories and by artist; he can generate a list of CD's to purchase; he can modify the list at any time during the transaction; he can pay by cash or credit card; and he can receive change if he pays by cash.

The block 92 inquires whether a customer has touched the customer video terminal. If so, then, by the blocks following block 92, the terminal displays a request that the customer choose a category of music from several possibilities, such as classical, country-western, etc. After the customer selects a category, the terminal prompts him to enter the name of a recording artist of interest, at block 96 in FIG. 13. As the customer enters letters, the display immediately starts to show an alphabetical list which begins close (alphabetically) to the letters entered. After a full name is entered, the display shows part of the alphabetical list, centered about the full name: a few names preceding the entered name are shown, along with a few names following the entered name.

Block 98 causes the display to ask the customer whether he wishes to purchase the CD whose name he entered. If he does, then block 101 leads to financial procedures discussed below. If not, block 103 asks the customer whether he wishes to scroll through the alphabetical list, and block 104 asks whether he wishes to change categories. Blocks 106 allow the customer to view a list of the CD's which he has tentatively selected for purchase. If so, block 109 in FIG. 10 is reached, which allows the customer to modify the list if desired.

Blocks 111 in FIG. 10 ask the customer whether he wishes to pay by cash or credit card. The customer can modify his list of purchases by answering negatively to both blocks, thereby reaching block 113. He can remove or add CD's on his list in blocks 114 and 115, or he can change the category in block 113 and return on path 116. When the customer is satisfied with his order list, he exits on line 120 and again reaches blocks 111, wherein he selects his method of payment, which leads him to either block 130 or 133 in FIG. 11. Again, following these blocks, the customer can modify his choices. If he declines modification, he reaches either block 134 or 135.

If the customer pays by cash, a bill validation system known in the art verifies payment. If by credit card, a magnetic credit card validator, known in the art, reads information from the card presented by the customer. In the case of credit payment, block 135 leads to block 136 in FIG. 14, which verified the validity of the credit card, and returns via line 139.

When payment has been finally made, and the customer finally decides to complete the purchase, block 151 is reached, wherein the control system transmits the location (i.e., rack number plus x- and y-coordinates) to the robot system, which retrieves the chosen CD-box and delivers it. If the robot arm was not successful, blocks 154 and 148 refund the customer's cash or credit his card account, as proper.

Figure 13:
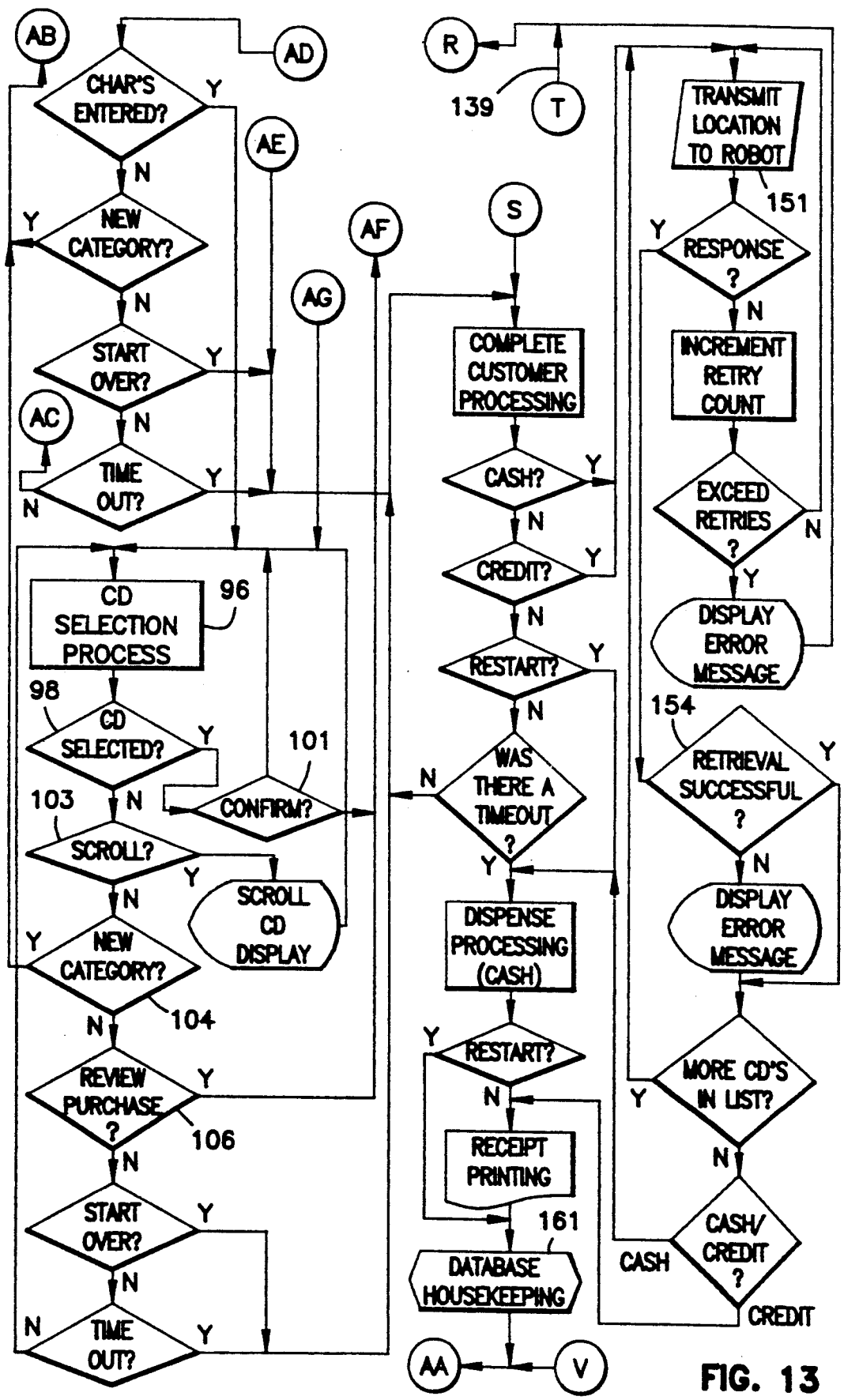

When the purchase is completed, block 161 in FIG. 13 leads to the beginning, namely, to block 89 in FIG. 10.

An examination of the flowcharts will show that the customer can cancel his purchase at numerous times during the ordering procedure, and obtain a refund. The customer can also modify his order list at numerous times during the transaction.

A person need not make payment to the store in order to view the catalog. Merely touching the video screen initiates display of the catalog. Merely touching the video screen initiates display of the catalog.

SAMPLING OF MUSIC

The store provides a speaker system 300 in FIG. 1 through which a customer can request samples of music to be played. That is, each vertical CD 21 displays a number. A keypad 306 is provided, into which a customer can enter one of the numbers. In response, an apparatus 305 plays a brief piece of music contained on the CD selected. One suitable system is a Computerized Music Sampling System, available from Advanced Communication Design, Inc., located in Bloomington, Minn.

Several significant features of the invention are the following:

One, as stated above, the vertical boxes serve as advertising. However, since they can be fetched by the robot arm, they are available for sale. Thus, the store does not need a supply of dummy boxes for advertising displays, which simplifies business operations.

Two, planar arrays of CD boxes have beed discussed. One definition of "planar array" is that corresponding surfaces on each box lie in a common plane. For example, surfaces 309 in FIG. 3 lie in a common plane (not shown), and surfaces 310 lie in a different, common plane.

Three, a central axis 250 in FIG. 2 can be defined. The CD-boxes lie at three or more different radial distances from the central axis, namely, distances 251, 252, and 253.

Four, the two flat surfaces of the vertical CD-boxes are visible to customers. This visibility allows the customer to see the list of songs contained on the CD, as well as other information. The horizontal boxes do not have this visibility: only part of a horizontal box is visible, and the relative visibilities will now be discussed.

As stated above, the boxes are about 4.9×5.6×0.4 inches. Such a box has three pairs of surfaces of identical area, namely, two of 27.44 in$^2$ (=4.9×5.6); two of 2.24 in$^2$ (=5.6×0.4); and two of 1.96 in$^2$ (=4.9×0.4). The two surfaces measuring 4.9×5.6 inches are the flat, or broad, surfaces.

The horizontal boxes only display the surface which is 1.96 in$^2$, when the racks are fully stocked with boxes. In contrast, the vertical boxes display three surfaces, namely, the two broad surfaces, and the surface which is 2.24 in$^2$. These three surfaces display an area of 27.44+27.44+2.24 in$^2$, or a total of 57.12 in$^2$. (The display of the 0.4×5.6 surface is possibly not significant).

Thus, the vertical boxes display a surface area which is greater by a factor of about 29. Viewed the opposite way, the horizontal boxes display a surface area which is about three percent of the vertical boxes' displayed are (i.e., 1.96/57.12).

It is possible that the box dimensions can be changed such that the vertical boxes display only three times (i.e., 3×) the surface area as the horizontal boxes. Such would be the case if the boxes were cubical: the "horizontal" boxes would display a single face, and the "vertical" boxes would display three faces. Five, the robotic arm has multiple motors which move its limbs about the multiple axes. It also has its own control system, including a microprocessor, which coordinates articulation of the limbs. The robot also has sensors assoicated with each axis which read the angular position of each limb, and report the positions to the control system.

Much of the control system represented by the flowchart of FIGS. 10–15 resides in a main computer which is separate from the control system of the robotic arm. The main computer communicates with the robot's control system through a standard RS-232 interface. Therefore, in the invention, two different computers are at work. In general, each performs a different function.

Six, the particular gripper used accommodates significant misalignment between the gripper and the CD-boxes, yet still allows the box to be grasped. For example, an angular misalignment, shown in FIG. 19, of up to 2.0 degrees can be tolerated. Further, a left-right misalignment, shown in FIG. 20, of 0.125 inch off-center, inch off-center, to either side, can be tolerated. Still further, a vertical misalignment of 1/16 inch off-center, to either side, shown in FIG. 21, can be tolerated. Further still, any combination of these misalignments can occur, yet successful grasping can still be executed.

Seven, remote actuation and deactuation of the store's power supply has been discussed. In addition, remote actuation and deactuation of individual components can be undertaken.

Eight, two belts 200 are used in FIG. 5. However, from one point of view, one of the belts is redundant: it merely serves to press the box 3 against the other belt, and the latter performs the conveying function. Accordingly, it is possible to use a single belt combined with a spring-loaded arm which presses the box against the belt.

Nine, the prone CD-boxes 3 in FIG. 1 can be viewed as forming a first collection of planar arrays surrounding axis 250. Each rack 2 forms one planar array. The vertical CD-boxes 21 can be viewed as forming a second collection of planar arrays, which surrounds the first collection. The vertical CD-boxes of one rack 2 form a single planar array.

Numerous substitutions and modifications can be undertaken without departing from the true spirit and scope of the invention as defined in the following claims. For example, the robotic arm can be programmed to perform a "dance," or other skit of stage entertainment, while retrieving and delivering the CD, for the amusement of the customer.

We claim:

1. An automated system for vending recorded music packaged in generally flat boxes, comprising:
   a) an articulated, multi-limbed robotic arm having a control system which controls motion of the limbs in response to a command to move the arm to a designated place;
   b) a gripper supported by the arm and having two conveyor belts capable of pinching one of the boxes therebetween and drawing the box into a pair of channels in the gripper;
   c) several stacks of horizontal boxes, at least partially surrounding the robotic arm, with a vertical space between adjacent stacks, the stacks being grouped into planar panels;
   d) several stacks of vertical boxes, located near respective vertical spaces, but farther from the arm than the horizontal boxes, with movable carriers associated with at least some vertical boxes for moving vertical boxes into the vertical space for allowing grasping by the gripper;

e) communication means for communicating with a customer;

f) computation means connected to the communication means and to the control system, for
  i) allowing a customer to designate boxes for purchase;
  ii) ascertaining the location of the designated box, in terms of rack address and x-y position within a rack;
  iii) informing the control system of the location, and prompting the control system to articulate the arm in order to position the gripper near the designated box;
  iv) accepting payment from the customer; and
  v) responding to external commands by doing one or more of the following:
    A) transmitting stored information;
    B) storing received information;
    C) terminating electric power to a component of the station; or
    D) connecting electric power to a component of the station; and g) means for playing samples of recorded music which is available for purchase, in response to a request by a person.

2. A system according to claim 1 in which the gripper conveyor belts comprises moving surfaces which can grasp and withdraw an article from a stored location, without bulk motion of either the gripper or the robotic arm.

3. A system according to claim 1 in which each of the planar panels forms one side of a polygon.

4. A system according to claim 1 in which the articles are supported by racks, and the articles rest in two different orientations in the racks.

5. A system according to claim 4 in which the gripper executes one sequence of actions in grasping articles of the first orientation, and a different sequence of actions in grasping articles of the second orientation.

6. A system according to claim 4 in which the articulated arm comprises a plurality of limbs articulated about respective axes, such that movement of several limbs is required to move the gripper from (A) a position for gripping articles of the first orientation to (B) a position for gripping articles of the second orientation.

7. A system according to claim 4 in which the gripper means comprises means for repositioning articles which are vertically oriented, prior to withdrawal of the vertical article.

8. A system according to claim 1 in which the articles of vertical orientation are supported by movable carriers which can be moved closer to the arm.

9. A system according to claim 1 further comprising a sensor on the gripper which produces one type of signal when an article enters the gripper and a second type of signal when the artical has further entered the gripper.

10. An automated system for vending recorded music packaged in generally flat boxes, comprising:
  a) a multi-limbed robotic arm having a control system which controls motion of the limbs in response to a command to move the arm to a designated place;
  b) a transport device, supported by the arm, for transporting boxes;
  c) several stacks of horizontal boxes, oriented adjacent to the robotic arm, wherein the stacks are grouped into planar panels;
  d) communication means for communicating with a customer;
  e) computation means connected to the communication means and to the control system, for
    i) allowing a customer to designate boxes for purchase;
    ii) ascertaining the location of the designated box, in terms of rack address and x-y position within a rack;
    iii) informing the control system of the location, and prompting the control system to move the arm in order to position the transport device near the designated box;
    iv) accepting payment from the customer; and
    v) responding to external commands by doing one or more of the following:
      A) transmitting stored information;
      B) storing received information;
      C) terminating electric power to a component of the station; or
      D) connecting electric power to a component of the station; and
  f) means for playing samples of recorded music which is available for purchase, in response to a request by a person.

11. The system of claim 10, wherein the transport device includes a gripper which is comprised of two conveyor belts arranged and configured for pinching individual boxes therebetween and drawing the box into a pair of channels in the gripper.

12. The system of claim 10, wherein adjacent stacks have vertical spaces located therebetween, and further comprising several stacks of vertical boxes, located near respective vertical spaces, but farther from the arm than the horizontal boxes, with movable carriers associated with at least some vertical boxes for moving vertical boxes into the vertical space for allowing grasping by the transport device.

13. The system of claim 10, wherein the robot arm is articulated.

14. An automated system for vending recorded music packaged in generally flat boxes, comprising:
  a) a multi-limbed robotic arm having a control system which controls motion of the limbs in response to a command to move the arm to a designated place;
  b) a transport device, supported by the arm, for transporting boxes;
  c) a grouping of vertical boxes, located near the robot arm, the vertical boxes being arranged and configured to be grasped by the transport device;
  d) communication means for communicating with a customer;
  e) computation means connected to the communication means and to the control system, for
    i) allowing a customer to designate boxes for purchase;
    ii) ascertaining the location of the designated box, in terms of rack address and x-y position within a rack;
    iii) informing the control system of the location, and prompting the control system to move the arm in order to position the transport device near the designated box;
    iv) accepting payment from the customer; and v) responding to external commands by doing one or more of the following:
   A) transmitting stored information;
   B) storing received information;
   C) terminating electric power to a component of the station; or
   D) connecting electric power to a component of the station; and
f) means for playing samples of recorded music which is available for purchase, in response to a request by a person.

15. The system of claim 14, further comprising several stacks of horizontal boxes, wherein the horizontal boxes are located adjacent to the robotic arm, are cooperatively interspersed with the vertical boxes, and are generally oriented into planar panels.

16. The system of claim 14, wherein the transport device includes a gripper which is comprised of two conveyor belts arranged and configured for pinching individual boxes therebetween and drawing the box into a pair of channels in the gripper.

17. The system of claim 14, wherein the robot arm is articulated.

* * * * *

UNITED STATES PATENT AND TRADEMARK OFFICE
CERTIFICATE OF CORRECTION

PATENT NO. : 5,206,814

DATED : April 27, 1993

INVENTOR(S) : Robert C. Cahlander et al.

It is certified that error appears in the above-identified patent and that said Letters Patent is hereby corrected as shown below:

On column (73), line Assignee, please delete "Wind" and substitute therefore --Wing--

On column 2, line 58, please insert --Also shown in the Figs. and set forth in the following table are several components, the function and operation of which are well known to those skilled in the art and so will not be described in detail herein:

On column 2, line 66, please delete "Fig. 3" and substitute therefore --Fig. 4--

On column 5, line 54, please delete "block" and substitute therefore --blocks--

On column 6, line 56, please delete "verified" and substitute therefore --verifies--

On column 7, lines 8 and 9, please delete "Merely touching the video screen initiates display of the catalog" after the word "catalog."

UNITED STATES PATENT AND TRADEMARK OFFICE
CERTIFICATE OF CORRECTION

PATENT NO. : 5,206,814
DATED : April 27, 1993
INVENTOR(S) : Robert C. Cahlander et al.

It is certified that error appears in the above-identified patent and that said Letters Patent is hereby corrected as shown below:

On column 7, line 63, please delete "are" and substitute therefore --area--

Signed and Sealed this

Twenty-sixth Day of April, 1994

BRUCE LEHMAN

Attest:

*Attesting Officer*         *Commissioner of Patents and Trademarks*